United States Patent [19]

Kweon

[11] Patent Number: 5,427,590
[45] Date of Patent: Jun. 27, 1995

[54] METHOD FOR MANUFACTURING A MATRIX FOR MOLTEN CARBONATE FUEL CELLS

[75] Inventor: Ho-Jin Kweon, Seoul, Rep. of Korea

[73] Assignee: Samsung Electronics Co., Ltd., Kyungki-Do, Rep. of Korea

[21] Appl. No.: 213,592

[22] Filed: Mar. 16, 1994

[30] Foreign Application Priority Data

Jun. 29, 1993 [KR] Rep. of Korea .................. 93-11951

[51] Int. Cl.⁶ ............................................. H01M 8/14
[52] U.S. Cl. .................................. 29/623.1; 429/12; 429/16; 429/41; 429/45; 429/46
[58] Field of Search ............................ 429/12, 16, 41, 45, 429/46; 29/623.1

[56] References Cited

U.S. PATENT DOCUMENTS

| 4,411,968 | 10/1983 | Reiser et al. | 429/41 |
| 4,511,636 | 4/1985 | Vogel et al. | 429/41 |
| 5,316,555 | 5/1994 | Ong et al. | 29/623.1 |

*Primary Examiner*—Stephen Kalafut
*Assistant Examiner*—M. Nuzzolillo
*Attorney, Agent, or Firm*—Sughrue, Mion, Zinn, Macpeak & Seas

[57] ABSTRACT

A manufacturing method of a matrix for a molten carbonate fuel cell, including the steps of saturating gamma-lithium aluminate with ammonia gas and adding sodium metal, can manufacture large-diameter gamma-lithium aluminate particles at a low temperature. The matrix, having gamma-lithium aluminate particles with diameters of 4–10 μm as the main component, has high intensity.

5 Claims, 6 Drawing Sheets

5,427,590

METHOD FOR MANUFACTURING A MATRIX FOR MOLTEN CARBONATE FUEL CELLS

FIELD OF THE INVENTION

The present invention relates to a matrix for a molten carbonate fuel cell, and more particularly, to a matrix having high intensity by sintering at a lower temperature and the manufacturing method thereof.

BACKGROUND OF THE INVENTION

A fuel cell, which is a new electricity generation system using electrical energy directly converted from the energy produced by the electrochemical reaction of a fuel gas and an oxidant gas, is under careful examination for use as a power source, such as that for space stations, unmanned facilities at sea or along coastal areas, fixed or mobile radios, automobiles, household electrical appliances or portable electrical appliances.

Fuel cells are divided into a molten carbonate electrolyte fuel cell operating at a high temperature (in the range of about 500° C. to about 700° C.), a phosphoric acid electrolyte fuel cell operating around 200° C., an alkaline electrolyte fuel cell operating at room temperature to about 100° C., and a solid electrolyte fuel cell operating at a very high temperature (1,000° C. or above).

A molten carbonate fuel cell (MCFC) is constituted by a porous nickel anode, a lithium-doped porous nickel-oxide cathode and a lithium aluminate matrix which is filled with lithium and potassium carbonate as electrolytes. The electrolytes are ionized by melting at about 500° C., and the carbonate ions generated therefrom establish electron flow between the electrodes. Hydrogen is consumed in the anode area, which thus produces water, carbon dioxide and electrons. The electrons flow to the cathode via an external circuit to produce the desired current flow.

The matrix of an MCFC is generally composed of gamma-lithium aluminate ($\gamma$-LiAlO$_2$) to be formed as a porous tile of about 0.5-2 mm in thickness. Such a matrix supports a mixed carbonate (Li$_2$CO$_3$/K$_2$CO$_3$), which is an electrolyte, and offers a path for carbonate ions (CO$_3^{-2}$) generated from the cathode to move toward the anode during operation. Further functions of the MCFC matrix are to provide electrical insulation between the electrodes, to prevent the mixing of various reactants such as fuels introduced to the respective electrodes or to the air, and to serve as a wet seal so that harmful gases do not leak from the cell. Differently from other electrochemical systems, the matrix in which electrolytes are impregnated exists as a solid at room temperatures and as a paste at 650° C., which is the operating temperature of an MCFC. Therefore, the performance of a matrix is determined by internal resistance, gas cross-over, the wet seal function of fuel cells, etc.

An MCFC matrix is subject to great stresses due to the large temperature differential which exists between room temperature and the cell operating temperature, and thus, functional stability is a prevailing problem. Therefore, investigations for overcoming the problem of functional stability are being made. For example, U.S. Pat. No. 4,322,482 disclosed that when 20 volume percent or less of lithium aluminate particles and/or alumina particles whose diameters are at least 50 microns are added to submicron lithium aluminate support particles, the formation of cracks due to temperature change is prevented. Also, U.S. Pat. No. 4,511,636 disclosed a matrix which can withstand a compression force occurring at the time of manufacture and is thus not fragile, by mixing an inert material whose diameter is less than about one micron with ceramic particles having diameters greater than about 25 microns and then adding about 35 volume percent of organic binder thereto. Here, lithium aluminate and alumina are examples of the inert material and the ceramic particles, respectively.

Lithium aluminate exists in three phases (states), namely, alpha ($\alpha$), beta ($\beta$) and gamma ($\gamma$). Of these phases, the $\gamma$-phase is the most stable at MCFC operation temperature of 650° C., and matrices composed of the $\gamma$-lithium aluminate are the most widely employed.

FIG. 1 is a photograph taken by a scanning electron microscope (SEM), showing a pellet manufactured by sintering the pure $\gamma$-lithium aluminate at 1,200° C. for four hours according to a conventional method. Here, the matrix for the conventionally manufactured MCFC has relatively small (about 1 $\mu$m) $\gamma$-lithium aluminate particles. Therefore, the resultant matrix does not have adequate pore distribution and the intensity is low, since structural stability is not maintained. Also, due to a high sintering temperature used in manufacturing the matrix, the overall manufacturing cost is considerably high.

SUMMARY OF THE INVENTION

In order to solve the above problems, an object of the present invention is to provide a matrix for an MCFC having high intensity and improved quality.

Another object of the present invention is to provide a method for manufacturing the above MCFC at a low cost.

To accomplish the above first object, according to the present invention, there is provided a matrix for an MCFC of high intensity and improved quality, wherein the main component is gamma-lithium aluminate ($\gamma$-LiAlO$_2$) particles having diameters of 4–10 $\mu$m. The term "main component" is defined for purposes of this application as meaning that more of this component is present than any other component (with respect to weight percent) in the matrix of the present invention. Here, the proportion of gamma-lithium aluminate particles is preferably 60% or more by weight.

Another object of the present invention is achieved by the manufacturing method of the matrix for an MCFC comprising the steps of: grinding gamma-lithium aluminate particles; stirring the gamma-lithium aluminate particles in a solvent; saturating the stirred mixture with ammonia gas and stirring again; adding sodium metal to the restirred mixture; obtaining precipitates from the sodium-metal-added mixture; and drying and sintering the precipitates.

In particular, in the step of saturating the ammonia gas and stirring, it is preferable to impregnate 350X–450X (in milliliters) of ammonia gas and stir for 23–25 hours. Here, the variable "X" is the gross mass (in grams) of the gamma-lithium aluminate. Also, the amount of added sodium metal is preferably X/50 mol in 30–35 sub-divided portions so as not to react explosively, and the sintering is preferably performed at a temperature in the range of 600°–1,100° C. for three to five hours. The preferred solvents are ethyl alcohol, 2-propanol or a mixture thereof. For the mixture, the preferred mixing ratio of ethyl alcohol to 2-propanol is 3:7. The most preferred solvent is 2-propanol.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE INVENTION

By the method according to the present invention, the treatment of gamma-lithium aluminate with ammonia gas and sodium metal in an appropriate solvent allows the sintering at a relatively low temperature to produce the gamma-lithium aluminate which is high in its purity and has particles of a large diameter, thereby obtaining a matrix for an MCFC whose intensity is high and whose quality is excellent.

The method for manufacturing the matrix according to the present invention will be explained below in detail.

First, the size of γ-lithium aluminate particles is made uniform by ball milling. The γ-lithium aluminate is added to 2-propanol, from which the water is removed by a molecular sieve of 4–6Å, and stirred for about 23–25 hours. Then, ammonia gas is introduced to saturation level, and the resultant is stirred again for another 23–25 hours. Here, the ammonia gas is introduced in the amount of about 350X–450X milliliters for the gross weight "X" grams of the γ-lithium aluminate by using a flow meter to reach saturation. The apparatus for stirring the resulting mixture and impregnating ammonia gas therein is illustrated in FIG. 8.

Figure 8:
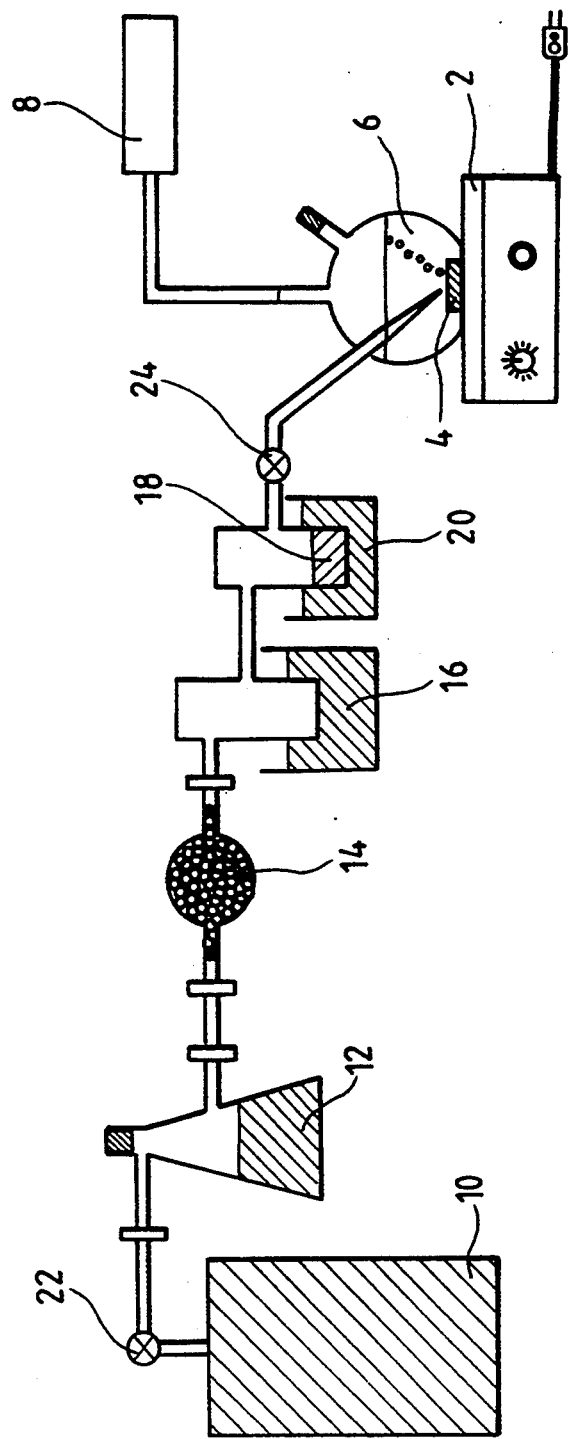
FIG. 8 is a diagram for explaining the manufacturing method of the matrix for the MCFC according to an embodiment of the present invention.

In the apparatus shown in FIG. 8, reference numeral 2 denotes a magnetic stirrer in which magnetic force is generated by electrical power, 4 denotes a magnetic bar which is rotated by the magnetic stirrer 2, 6 denotes a mixture of γ-lithium aluminate and 2-propanol, 8 denotes a vacuum pump, 10 denotes an ammonia gas tank in which ammonia gas is filled, 12 denotes a flask holding calcium chloride therein, 14 denotes calcium chloride, 16 denotes a mixture of ice and sodium chloride, 18 denotes sodium metal, 20 is a mixture of dry ice and acetone, and 22 and 24 denote valves.

After the stirred mixture of γ-lithium aluminate and 2-propanol is saturated with ammonia gas, the resultant is stirred for 24 hours until the reaction is complete. Then, X/50 mol of sodium metal is added in small amounts such that it is subdivided 30–35 times so as to prevent an explosive reaction from happening. Thereafter, precipitates are separated from the mixture by means of a centrifuge. The acquired precipitates are dried and sintered at 600° C.–1,000° C. for three to five hours, thereby forming a high-intensity matrix according to the present invention.

In the method according to tile present invention, a chemical treatment of γ-lithium aluminate allows the particles to pass through a sol-state. Here, the diameter becomes a few nanometers. Next, sintering makes the diameter larger, and it is possible to adjust the diameter by adjusting the sintering temperature and duration.

Hereinbelow, preferred embodiments of the present invention are described in detail with reference to examples. However, the present invention is not limited to the following embodiments. Unless otherwise indicated, all parts, percents, ratios and the like are by weight.

The materials used in these experiments included γ-lithium aluminate which was ball-milled for 72 hours, 2-propanol from which the water was removed by a molecular sieve, and sodium metal (3–8 mm in caliber and 0.1 grams each). Also, 98% ammonia, dehumidified by passing through calcium chloride, was used as shown in FIG. 8 (ammonia was passed through calcium chloride 12 and 14), in anticipation of lowering the purity and water content.

The devices and material used for confirming the acquired materials were a scanning electron microscope, JSM 5200, manufactured by JEOL Co., an X-ray diffractometer, manufactured by Rigaku Co., for confirming the surface and matrix structure, inductively coupled plasma, Perkin Elmer Plasma 40, a gas chromatography-mass spectrometer, GC-MASS HP 5988, an IR spectrometer, Biorad FT-60, and a UV-VIS spectrometer, HP diode array 8452A for confirming the composition materials.

EXAMPLE 1

First, γ-lithium aluminate (Johnson & Metthey Co.) was ball-milled in a 500 ml volumetric reactive container having three branches for 72 hours to make the particle size uniform. Then, to assure that the ball-milled γ-lithium aluminate was in the γ-phase, it was reacted at 1,000° C. for six hours.

Next, 300 ml of 2-propanol (GR grade, Merck Co.) from which the water was removed by using a molecular sieve for 24 hours was stirred after being added to 50 g of the γ-lithium aluminate. The stirring was performed with a magnetic stirrer using the apparatus shown in FIG. 8 for about 24 hours.

Then, ammonia gas was introduced to the mixture to reach to a saturated state at a flow rate of 400 cc per minute by passing through calcium chloride, a bath containing sodium chloride and ice and a bath containing acetone and dry ice, using the apparatus shown in FIG. 8. The confirmation of the saturated state was achieved by the backward flow of the solution due to a back pressure within the reaction container.

The reaction was completed by stirring sufficiently for 24 hours, and after saturating with ammonia gas, a small amount of sodium metal (Aldrich Co. spheres of 3–8 mm and 0.1 g each) was added 30–35 times by subdivisions.

After the reactant mixture was centrifuged to obtain precipitates and dried in an oven, the physical property of the powder was examined by an X-ray diffractometer. Then, the powder was processed to manufacture a pellet of 1.5 cm in diameter at a pressure of 8,000 kPa/cm$^2$ and sintered at 1,000° C. for four hours.

Figure 2:
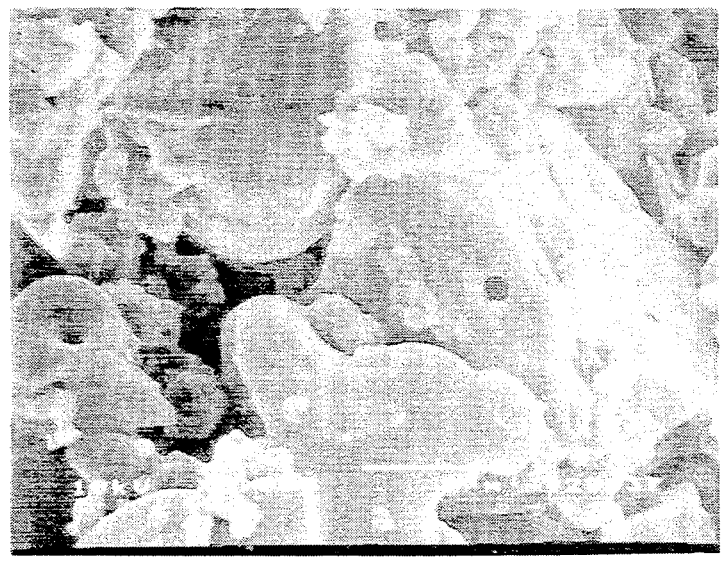
FIG. 2 is a scanning electron microscope (SEM) picture for a pellet manufactured by sintering gamma-lithium aluminate to which ammonia gas and sodium metal are added at 1,000° C. for four hours according to an embodiment of the present invention.

FIG. 2 is a scanning electron microscope (SEM) picture for the pellet manufactured by sintering at 1,000° C. for four hours, which confirms that the pellet is made of γ-lithium aluminate and that the diameters of most particles are in the range of 1–20 μm. About 20% of these γ-lithium aluminate particles were 1–4 μm in diameter and about 80% were 4–20 μm in diameter.

EXAMPLE 2

The pellet was manufactured by the same method as that of Example 1, and the sintering was performed at 900° C. for four hours.

Figure 3:
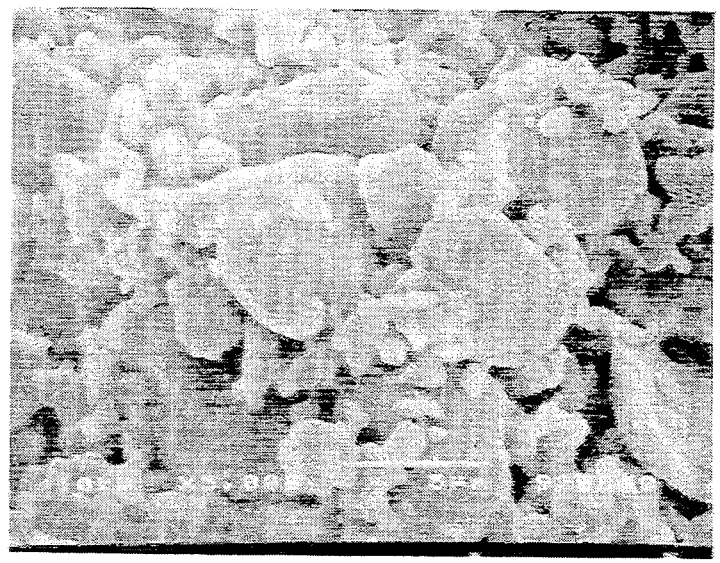
FIG. 3 is a scanning electron microscope (SEM) picture for a pellet manufactured by sintering gamma-lithium aluminate to which ammonia gas and sodium metal are added at 900° C. for four hours according to another embodiment of the present invention.

FIG. 3 is a scanning electron microscope (SEM) picture for a pellet manufactured by sintering at 900° C. for four hours according to the above embodiment. It was confirmed that the pellet was made of γ-lithium aluminate and that about 40% of the particles were 1–4 μm in diameter and about 60% were 4–20 μm in diameter.

EXAMPLE 3

The pellet was manufactured by the same method as that of Example 1, and the sintering was performed at 800° C. for four hours.

Figure 4:
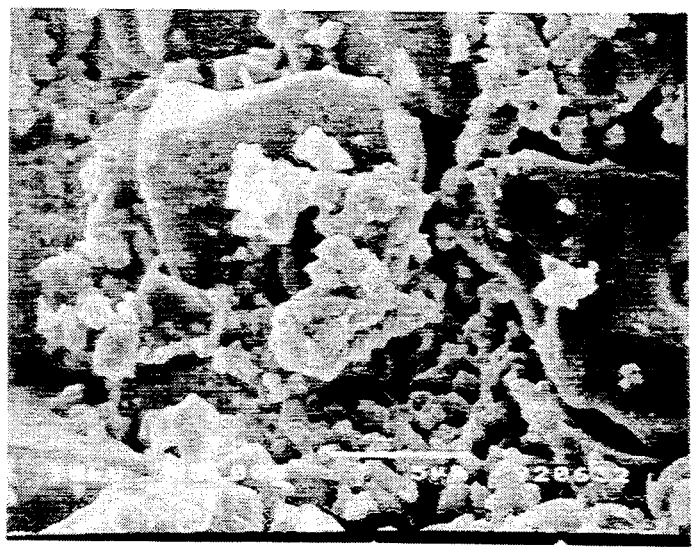
FIG. 4 is a scanning electron microscope (SEM) picture for a pellet manufactured by sintering gamma-lithium aluminate to which ammonia gas and sodium metal are added at 800° C. for four hours according to still another embodiment of the present invention.

FIG. 4 is a scanning electron microscope (SEM) picture for a pellet manufactured by sintering at 800° C. for four hours according to the above embodiment. It was confirmed that the pellet was made of γ-lithium aluminate and that about 40% of the particles were 1–4 μm in diameter and about 60% were 4–15 μm in diameter.

EXAMPLE 4

The pellet was manufactured by the same method as that of Example 1, and the sintering was performed at 650° C. for four hours.

Figure 5:
FIG. 5 is a scanning electron microscope (SEM) picture for a pellet manufactured by sintering gamma-lithium aluminate to which ammonia gas and sodium metal are added at 650° C. for four hours according to yet another embodiment of the present invention.

FIG. 5 is a scanning electron microscope (SEM) picture for a pellet manufactured by sintering at 650° C. for four hours according to the above embodiment. It was confirmed that the pellet was made of γ-lithium aluminate and that about 40% of the particles were 1–4 μm in diameter and about 60% were 4–10 μm in diameter.

COMPARISON EXAMPLE

A pellet made of a pure γ-lithium aluminate was manufactured in a predetermined shape and then sintered at 1,200° C. for four hours without performing the steps of ball-milling, stirring with 2-propanol, stirring in saturated ammonia gas, adding sodium metal, obtaining precipitates by centrifuging the mixture, and drying the precipitates as in Example 1.

Figure 1:
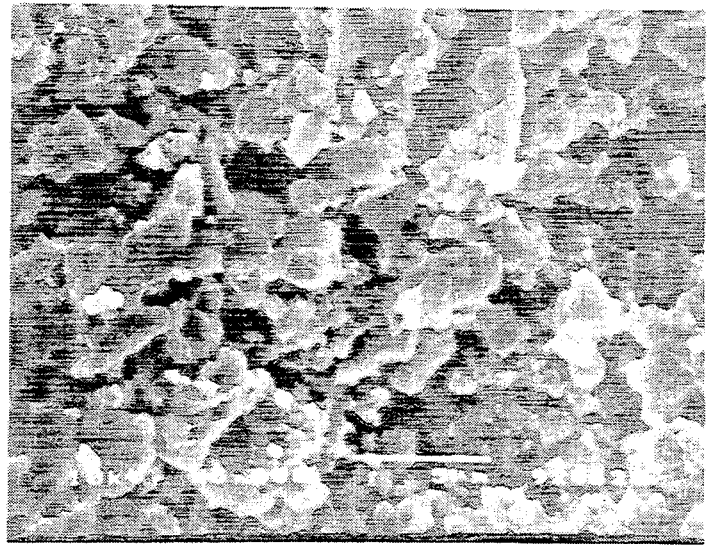
FIG. 1 is a scanning electron microscope (SEM) picture for a pellet manufactured by sintering pure gamma-lithium aluminate at 1,200° C. for four hours according to a conventional method.

FIG. 1 is a scanning electron microscope (SEM) picture for a pellet manufactured by sintering the pure γ-lithium aluminate at 1,200° C. for four hours. It was confirmed that the pellet was made of γ-lithium aluminate and that almost all particles were 1–4 μm in diameter.

Upon comparison of the SEM pictures of the pellets shown in FIGS. 1 to 5, it is understood that the particle diameters in the pellet manufactured according to the present invention (FIGS. 2 to 5) are far greater than that shown in FIG. 1.

Next, to confirm the components of the pellet as manufactured above, the solution which was saturated with ammonia gas and to which sodium metal was added according to Example 1 was dried to obtain a powder. An X-ray diffraction analysis was performed for the obtained powder and then compared with the pure γ-lithium aluminate.

Figure 6:
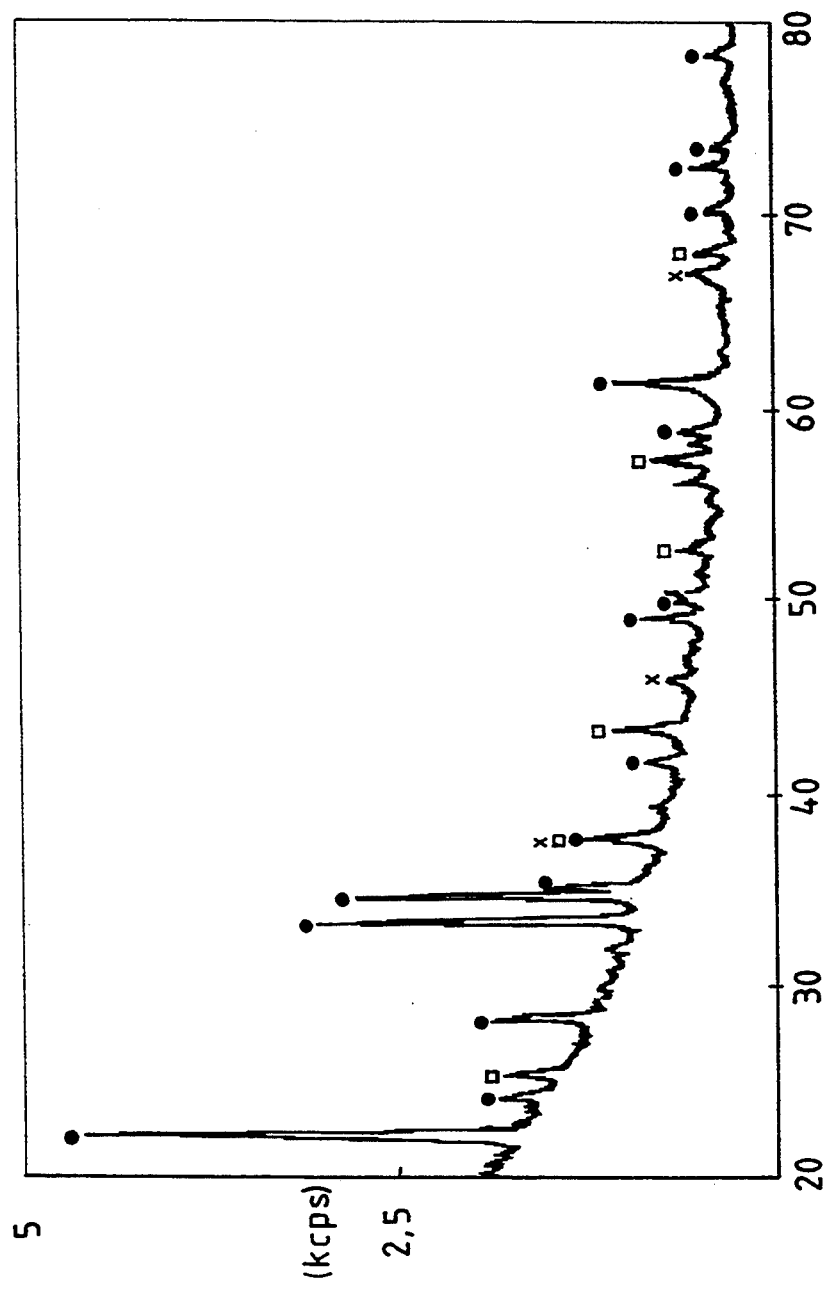
FIG. 6 is a graph showing an X-ray diffraction analysis of pure gamma-lithium aluminate.
Figure 7:
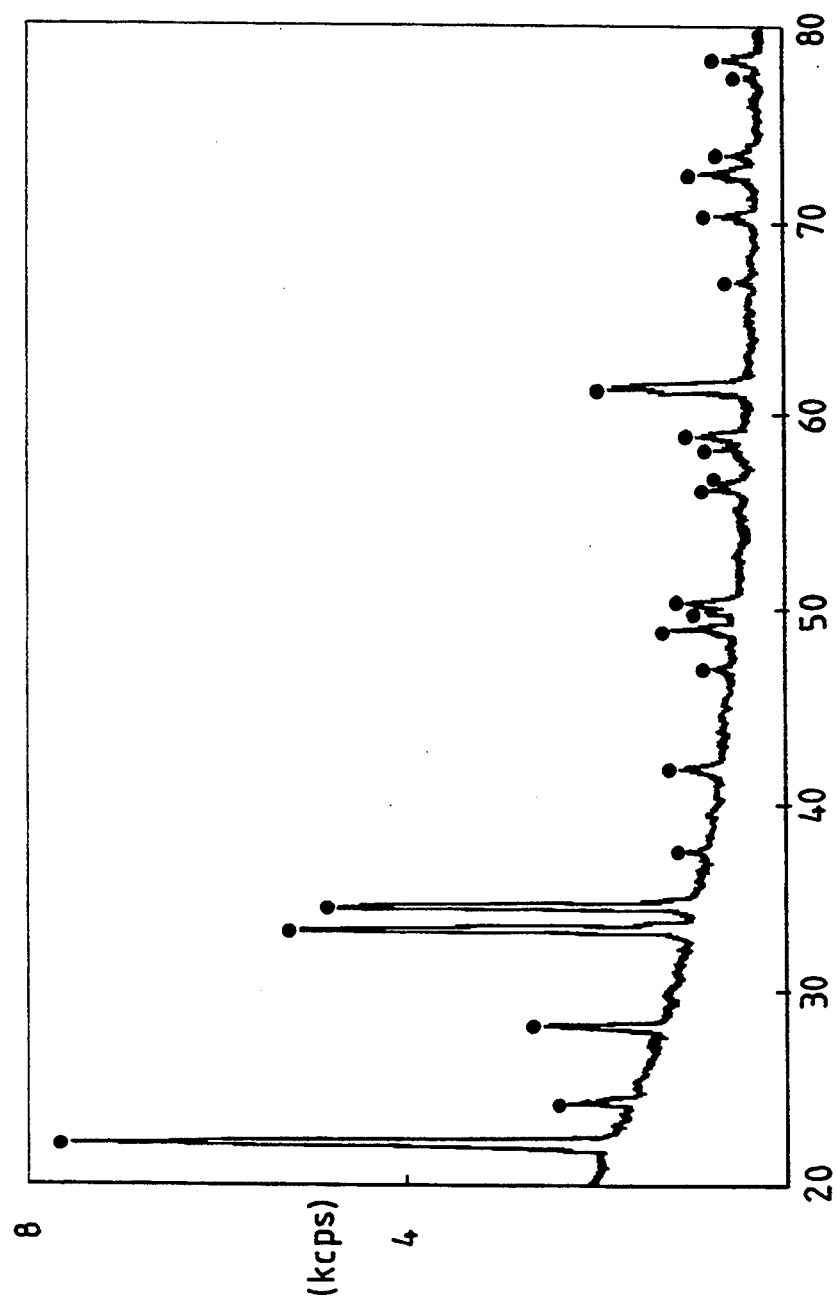
FIG. 7 is a graph showing an X-ray diffraction analysis of gammalithium aluminate to which ammonia gas and sodium metal are added according to the present invention.

FIG. 6 shows an X-ray diffraction analysis of the pure γ-lithium aluminate and FIG. 7 shows that of the γ-lithium aluminate manufactured according to the present invention. In the drawings, the peaks marked with a dot correspond to γ-lithium aluminate, the peaks marked with a square correspond to $\alpha$-$Al_2O_3$, and the peaks marked with an "X" correspond to $LiAl_5O_8$.

In FIG. 6 showing the data by the X-ray diffraction analysis of the pure γ-lithium aluminate, it is confirmed that various materials, such as $\alpha$-$Al_2O_3$ and $LiAl_5O_8$, other than γ-lithium aluminate exist as a mixture, which means that a few oxidants exist in the pure γ-lithium aluminate as impurities. On the other hand, in FIG. 7 showing the data by the X-ray diffraction analysis of the powder obtained by processing γ-lithium aluminate according to the present invention, it is confirmed that only the peaks corresponding to the pure γ-lithium aluminate (marked with "●") are present, which means that the pure γ-lithium aluminate product is obtained by the treatment according to the method of the present invention. In other words, according to the present invention, since the γ-lithium aluminate is pure and has a large diameter, it is possible to manufacture an excellent matrix.

To analyze the data in more detail, it is understood that the γ-lithium aluminate used as a starting material contains about 10% of $\alpha$-$Al_2O_3$. In the method according to the present invention, the treatment with ammonia gas and the addition of sodium metal allow the $\alpha$-$Al_2O_3$ to melt and to form a metal-alkoxide, i.e., aluminum isopropoxide, which exists as a sol-state until sintering processing, where a mutual combination occurs to produce larger particles.

If a matrix is manufactured with large-diameter particles, the intensity becomes higher. Using three documents (i.e., "Observations and Mechanisms of Fracture in Polycrystalline Alumina," by P. I. Gutshall and G. E. Gross, *Eng. Frc. Mech.*, Vol. 1, pp.463–471, 1969; "Transgranular and Intergranular Fracture in Polycrystalline Alumina," by A. H. Heur, *J. Am. Ceram, Soc.*, pp.510–511, 1969; and "Destruction Driving Change of a PZT Ceramic Body According to Particle Size," Master thesis of the Department of Inorganic Material Engineering Science, Seoul National University, 1988), the following explanation will be made or this particle-size/intensity relationship.

That is to say, since a pellet of small-diameter particles does not have a fractural structure, the internal tension due to the phase change is all concentrated on the boundary portion of the particles, thereby mainly producing the destruction of the particle boundary. On the other hand, since a pellet of large-diameter particles has a fractural structure, the internal tension concentrated on the boundary portion of the particles is decreased, and accordingly, the destruction is decreased.

Also, the destructive aspect of materials is related to the intensity of the materials. Here, if other factors are the same, the case of internal particle destruction has a higher intensity than that for inter-particle destruction. Since the coherence of the particle boundary portion is generally weaker than that of the particle interior, when the destruction of a particle boundary is caused, cracks easily extend along the particle boundaries.

Therefore, it is also understood that the matrix, manufactured of a gamma-lithium aluminate which is pure and has large-diameter particles according to the present invention, has a higher intensity than that manufactured by a conventional method.

In order to confirm that the intensity of the matrix manufactured according to the present invention is higher, an impact experiment has been performed such that same-sized pellets are dropped from a given height and the degrees of breaking or cracking are compared. The result of the experiment, in which the intensities of the pellets are graded by a determination made with the naked eye (with the intensity grades ranging in order from A, the highest, to D, the lowest), is shown in the following Table 1.

TABLE 1

| pellet | sintering temperature | grade |
| --- | --- | --- |
| Example 1 | 1,000° C. | A |
| Example 2 | 900° C. | B |
| Example 3 | 800° C. | C |
| Example 4 | 650° C. | D |
| Comparison Example | 1,200° C. | D |

From the above table, it is confirmed that the pellet manufactured according to the present invention has a higher intensity than the conventional one and that the higher the sintering temperature is, the higher the intensity is. Also, although a pellet is manufactured by the method according to the present invention, if the sintering temperature is reduced to 650° C. or below, a high-intensity pellet cannot be obtained, which implies that sintering at a temperature which is too low cannot produce an excellent effect. However, since the matrix according to the present invention, compared with the conventional method, can be manufactured at relatively low temperatures, e.g., 1,000° C., 900° C., 800° C. or 650° C., the manufacturing cost is considerably reduced. Therefore, the matrix for an MCFC manufactured by the method according to the present invention, which has excellent intensity and quality, is very useful.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A method for manufacturing a matrix for a molten carbonate fuel cell, comprising the steps of:
   grinding gamma-lithium aluminate particles;
   stirring said gamma-lithium aluminate particles in a solvent to produce a stirred mixture;
   saturating said stirred mixture with ammonia gas and stirring again to produce a restirred mixture;
   adding sodium metal to said restirred mixture to produce a sodium-metal-added mixture;
   obtaining precipitates from said sodium-metal-added mixture; and
   drying and sintering said precipitates.

2. A method for manufacturing a matrix for a molten carbonate fuel cell as claimed in claim 1, wherein 350X–450X milliliters of ammonia gas is impregnated in the stirred mixture of the gamma-lithium aluminate particles and solvent to produce a resultant mixture, and the resultant mixture is stirred for 23–25 hours, wherein X is the gross mass in grams of the gamma-lithium aluminate.

3. A method for manufacturing a matrix for a molten carbonate fuel cell as claimed in claim 1, wherein X/50 mol of said sodium metal is separately added in 30–35 subdivisions to said restirred mixture so as not to react explosively, wherein X is the gross mass in grams of the gamma-lithium aluminate.

4. A method for manufacturing the matrix for a molten carbonate fuel cell as claimed in claim 1, wherein said sintering is performed at a temperature in the range of 600°–1,100° C. for three to five hours.

5. A method for manufacturing the matrix for a molten carbonate fuel cell as claimed in claim 1, wherein said solvent is 2-propanol.

* * * * *